United States Patent [19]

Marth

[11] Patent Number: 4,693,679
[45] Date of Patent: Sep. 15, 1987

[54] AUTOMATIC LATCH FOR MOLD CLOSING

[75] Inventor: Peter Marth, Konigswinter, Fed. Rep. of Germany

[73] Assignee: Mauser-Werke GmbH, Bruhl, Fed. Rep. of Germany

[21] Appl. No.: 795,690

[22] Filed: Nov. 6, 1985

[30] Foreign Application Priority Data

Nov. 6, 1984 [DE] Fed. Rep. of Germany ....... 3440476

[51] Int. Cl.⁴ .................. B29C 39/26; B29C 45/26
[52] U.S. Cl. .................................. 425/589; 425/595; 425/451.9; 425/DIG. 221
[58] Field of Search ............ 425/595, 451.9, 589, 425/DIG. 221

[56] References Cited

U.S. PATENT DOCUMENTS

| 4,315,727 | 2/1982 | Black ................................ 425/595 |
| 4,372,738 | 2/1983 | Black et al. ...................... 425/595 |
| 4,594,067 | 6/1986 | Langos .......................... 425/451.9 |

Primary Examiner—Willard E. Hoag
Attorney, Agent, or Firm—Pennie & Edmonds

[57] ABSTRACT

A locking device for locking two mold halves in the closed position for a blow molding process by use of a shaft with at least one lug on one coupling member and a mating key hole in a second coupling member such that the lug passes through the keyhole and is rotated within said second coupling to lock by engaging the lug with a flange of the keyhole. The rotation of the lug being effected by a guide rod and co-operating guide slots such that as the shaft of the coupling member moves in the locking direction the guide rod is guided by the slots to rotate the lug into the locking position.

6 Claims, 4 Drawing Figures

AUTOMATIC LATCH FOR MOLD CLOSING

FIELD OF THE INVENTION

The invention relates to the field of molding apparatus and, in particular, to latches for molding devices used in blow molding.

BACKGROUND OF THE INVENTION

Molding devices are known which use separate transport and locking units. These devices use a relatively low-powered transport unit to move the mold halves into positions near each other and a second high-powered locking unit to provide the locking forces to lock the mold closed. The locking forces are provided by tension couplings attached directly to the mold holders and capable of being moved in the direction of mold travel.

Such locking devices include rigid coupling halves on one mold half which engage hydraulically displaceable coupling halves on the opposing mold half. The two coupling halves engage shortly before the transport device finishes moving the mold halves into a slightly separated position. At this point, the locking device is engaged and activated to transmit the closing and locking forces with an even distribution of the mold closing forces throughout the mold halves.

This type of mold closing and locking device eliminates the deformation forces which would normally act on a machine frame. This allows frameless contruction. Space limitations are overcome to a large extent and distribution of the locking forces on the mold halves is optimized. At the same time, the transport mechanism is simplified and the space inside the machine is optimized.

By mounting the couplings on the mold halves, a closed system of forces is created in the mold halves because the reactions are used as closure and closing forces. The closure forces in the mold halves may be more controlled. This enables the mold halves or fixture plates to be interchangeable. This increases the number of uses for the machine.

In operation, a plastic tube or preform is extruded between the opened mold halves. After the preform has been fully extruded, the halves of the mold are moved toward each other until they are separated by a distance approximately the same as the diameter of the preform. The transport system which moves the mold halves to this position is shut down once the couplings are properly engaged. The hydraulic locking system is then operated to draw the mold halves together and lock them into place. The power of the locking system is great enough to pinch off the preform tube and weld it together at the seams. The coupling members are positioned, depending on the mold in use, to exert uniform action on the halves of the mold. This avoids much of the mold deformation of the Prior Art.

It is seen therefore that the couplings must be designed in such a way to withstand the great locking forces they are subjected to without an overly complex and expensive design.

SUMMARY OF THE INVENTION

The invention solves many of the problems of the prior art while providing a quick automatic coupling. The rear of each piston of the hydraulically operated locking coupling is provided with a guide rod. The guide rod extends from the cylinder housing in an axial direction. The guide rod has rollers which fit into fixed slots. The slots are initially straight and then curve at an oblique angle to the axis of the cylinder and then follow a straight (axial) path, which is offset from the initial straight portion.

By use of the coupling of the invention, separate rotary drives for the couplings may be dispensed with. This eliminates sources of error and the effects of severe wear present under severe operating conditions. The coupling and rotation is accomplished by conversion and guidance of the linear motion of the push rod into rotary motion and back to linear motion. The push rod is mounted to the head of the coupling and excludes any unwanted change in the control operation and attendant trouble with the coupling process.

The axial advancing forces are used to also provide the rotation to lock and unlock the couplings. The point during locking at which the rotation occurs is permanently set by the shape of the slots. Thus, it cannot be changed without changing the slots. The angular direction of the slot bend determines the rotation of the guide rod and hence that of the push rod and coupling head.

DESCRIPTION OF THE PREFERRED EMBODIMENT

Figure 1:
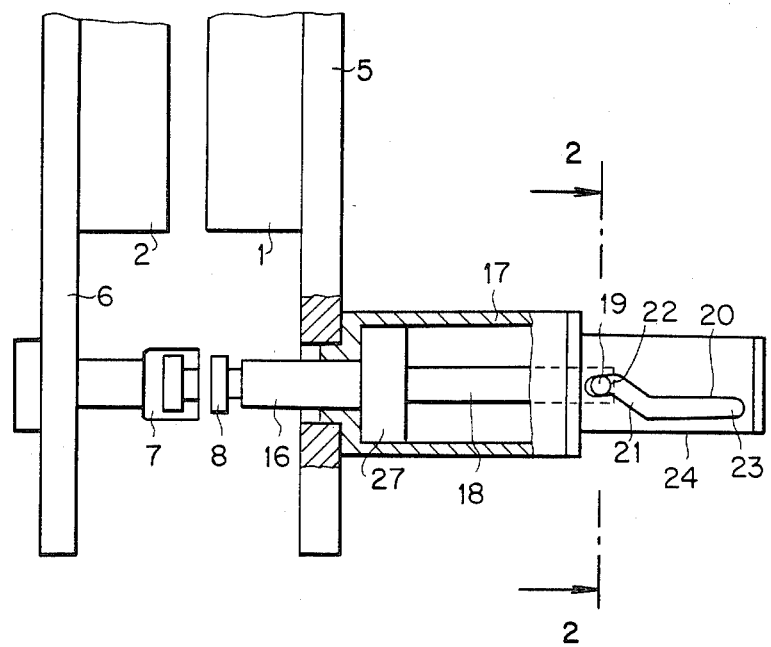
FIG. 1 shows a mold holder with a coupling means of the invention.

The device of the invention is shown in FIG. 1 where the mold halves 1, 2 are shown schematically. The mold halves 1, 2 are mounted on mold holders 5, 6. The locking device of the invention has a stationary coupling member 7 which is mounted to mold holder 6 on which mold half 2 is mounted. The displaceable coupling member 8 is located at one end of push rod 16. Push rod 16 extends from piston 27 which is disposed within the cylinder housing 17. Piston 27 and cylinder housing 17 make up a hydraulically actuated device.

A guide rod 18, similar to push rod 16, extends from the opposite side of piston 27 from push rod 16. Guide rod 18 extends from the cylinder housing 17. At the end of guide rod 18, opposite piston 27, are mounted two diametrically opposed rollers 19. The rollers 19 rotate about axis perpendicular to the longitudinal axis of guide rod 18.

Guide rod 18 extends into sleeve 24 mounted on cylinder 17. The sleeve 24 has internal slots 20. The initial portions 22 of slots 20 extend axially of the cylinder. The slots then curve to follow a path 21 angled to the sleeve axis. Angled paths 21 are inclined obliquely to the path of thrust (axis) of piston 27. Finally, the slots form a second straight portion 23 which extends axially of the cylinder but are offset from portions 22.

Figure 2:
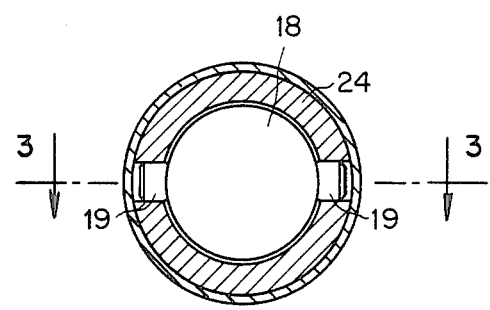
FIG. 2 is a view along lines II—II of FIG. 1.
Figure 3:
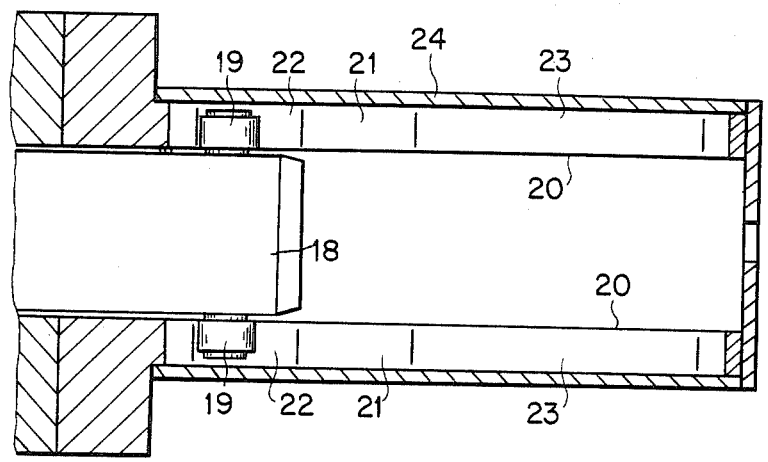
FIG. 3 is a view along lines III—III of FIG. 2.

As shown in FIGS. 2 and 3, the rollers 19 of guide rod 18 are received within the slots 20. Piston 27 is shown in FIG. 1 in the fully open position of the coupling. In this position the mold halves are also open.

Figure 4:
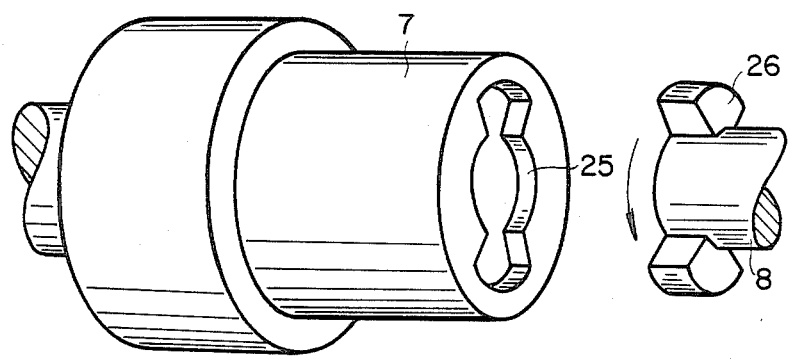
FIG. 4 is a perspective view of the coupling interlocking heads.

To close the mold, the mold holders 5, 6 are moved toward each other by transport means (not shown). This slides coupling member 8 with lugs 26 (FIG. 4) within coupling member 7 by passing lugs 26 through keyhole 25. As the closing motion continues, the push rod 16 moves piston 27 and guide rod 18 to the right of FIG. 1. As the piston is moved, rollers 19 leave the initial portions 22 of slots 20. At this point, the rollers enter angled path 21. This causes the coupling member 8, push rod 16, piston 27 and guide rod 18 to rotate in the direction shown by the arrow in FIG. 4. This rotation positions lugs 26 behind the flanges of keyhole 25.

A plurality of such coupling devices are positioned on mold carriers 5, 6. At this point the coupling members 7, 8 are interlocked and the transport means is shut off. The remaining closing motion and force is effected by the coupling devices. The devices are energized hydraulically to move piston 27 farther to the right. The rollers 19 are in straight portions 23 of slots 20 and therefore the coupling members remain interlocked. The hydraulic energizing of the unit formed of piston 27 and cylinder 17 provides the force to pull the mold closed and hold it closed during the molding process. When molding is complete, the mold is opened by reversing the closing process. The coupling members 7, 8 will automatically disengage when the piston 27 is returned to the left moving rollers 19 back to initial portion 22 and realigning lugs 26 in keyhole 25.

I claim:

1. A molding apparatus with means for coupling and locking two mold halves together comprising:
   (a) a first coupling member supported by a mold holder for a first mold half and movable rotationally and axially relative to said holder;
   (b) a second coupling member mounted to a second mold half and axially aligned with said first coupling member;
   (c) a first locking formation on said first coupling member and a mating second locking formation formed on said second coupling member such that when said first and second locking formations are engaged they lock said first and second coupling members to one another when they are rotated to a first position and unlock when rotated to a second position; and
   (d) piston actuator means for rotating and axially moving said first coupling member so that said first locking formation is rotated from said second position, wherein said mold halves are separated, to said first position, wherein said mold halves are closed together, and from said first position to said second position.

2. The apparatus according to claim 1 wherein said means for rotating and axially moving said first coupling member comprises:
   (a) a hollow cylinder on the side of said first coupling member opposite said second coupling member;
   (b) at least one slot formed in the internal surface of said cylinder and extending axially and circumferentially along said surface;
   (c) guide means extending from said first coupling member into said cylinder, said guide means engaging at least one slot such that upon axial movement of said first coupling member, said guide means will move axially along said slot in said cylinder and be rotated by the circumferentially extending portion of said slot and thereby rotate and axially moves the first coupling member 3. The apparatus according to claim 2 wherein:
   (a) a first slot portion extends axially along a portion of said cylinder;
   (b) a second slot portion communicates with said first slot portion and extends at an oblique angle to said first slot portion;
   (c) a third slot portion communicates with said second slot portion and extends axially of said cylinder at a position circumferentially offset from said first slot portion.

4. The apparatus according to claim 2 wherein said locking formations include:
   (a) a rod-like extension of said first coupling member having at least one radially extending lug protruding from it;
   (b) said second locking formation defines a hollow housing and axially extending keyhole such that said rod-like extension may pass into said hollow housing in said second position of relative rotation and upon rotating to said first position of relative rotation said lug engages an inner surface of said housing to prevent its removal.

5. The apparatus according to any of the claims 1-4 wherein:
   (a) the piston actuator includes hydraulic means to move said first coupling member in the axial direction once the locking formation have been engaged in said first position.

6. The apparatus according to claim 2 wherein:
   (a) said means for axially moving said first coupling member includes a separate transport means which axially moves the mold halves toward each other until the locking formations engage in said first position; and
   (b) said first coupling member abutting against said second coupling member to move said first coupling member axially and rotationally during operation of said transport means.

* * * * *